US012652517B2

(12) United States Patent (10) Patent No.: US 12,652,517 B2
Guo (45) Date of Patent: Jun. 9, 2026

(54) METHOD FOR WIRELESS COMMUNICATION AND NETWORK DEVICE

(71) Applicant: GUANGDONG OPPO MOBILE TELECOMMUNICATIONS CORP., LTD., Dongguan (CN)

(72) Inventor: Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 693 days.

(21) Appl. No.: 18/145,753

(22) Filed: Dec. 22, 2022

(65) Prior Publication Data

US 2023/0126999 A1 Apr. 27, 2023

Related U.S. Application Data

(63) Continuation of application No. PCT/CN2020/112164, filed on Aug. 28, 2020.

(51) Int. Cl.
*H04W 8/00* (2009.01)
*H04W 12/06* (2021.01)
(52) U.S. Cl.
CPC ........... *H04W 8/005* (2013.01); *H04W 12/06* (2013.01)
(58) Field of Classification Search
CPC ..... H04W 8/005; H04W 12/06; H04W 4/021; H04W 4/029
See application file for complete search history.

(56) References Cited

U.S. PATENT DOCUMENTS

| | | | | |
|---|---|---|---|---|
| 2015/0201086 A1* | 7/2015 | Abi | ..................... | H04M 1/2535 |
| | | | | 370/352 |
| 2017/0311243 A1 | 10/2017 | Rinne et al. | | |
| 2018/0262924 A1 | 9/2018 | Dao et al. | | |
| 2019/0166500 A1 | 5/2019 | Henda et al. | | |
| 2020/0394926 A1* | 12/2020 | Naini | ..................... | H04W 4/44 |

FOREIGN PATENT DOCUMENTS

| | | |
|---|---|---|
| CN | 103731902 A | 4/2014 |
| CN | 109983792 A | 7/2019 |
| IN | 202037020067 A | 10/2020 |
| WO | 2018174846 A1 | 9/2018 |

(Continued)

OTHER PUBLICATIONS

3GPP TR 23.754 v0.1.0 (Jan. 2020) 3rd Generation Partnership Project; Technical Specification Group Services and System Aspects; Study on supporting Unmanned Aerial Systems (UAS) connectivity, Identification and tracking (Release 17), pp. 12-13 (Year: 2020).*

(Continued)

*Primary Examiner* — Brandon J Miller
(74) *Attorney, Agent, or Firm* — PERKINS COIE LLP

(57) ABSTRACT

A method for wireless communication and a network device are provided. The method comprises: a first network device receiving a first message sent by a query device, the first message comprising first region information and used to request to query terminals in a first region indicated by the first region information; and the first network device sending a list of target terminals in the first region to the query device.

20 Claims, 5 Drawing Sheets

(56)                References Cited

FOREIGN PATENT DOCUMENTS

WO        2020108002  A1      6/2020
WO        2020164026  A1      8/2020

OTHER PUBLICATIONS

Second Office Action of the Chinese application No. 202310647771. 9, issued on Nov. 15, 2024. 17 pages with English translation.
3GPP."Study on Supporting Unmanned Aerial Systems (UAS) Connectivity. Identification and Tracking"3GPP TR 23.754 V0.1.0, Jan. 30, 2020 (Jan. 30, 2020), section 6, figure 6.1.2-1—18 pages.
Interdigital. "Update to Solution# 1: Identification of UAVs in a Target Area" SA WG2 Meeting #139e S2-2004171, May 22, 2020 (May 22, 2020), section 2—4 pages.
Huawei et al. "Solution to UAV Remote Identification and Tracking" SA WG2 Meeting #136AH S2-2001647, Jan. 17, 2020 (Jan. 17, 2020), section 2—4 pages.
International Search Report in the international application No. PCT/CN2020/112164, mailed on May 17, 2021—5 pages.
Written Opinion of the International Search Authority in the international application No. PCT/CN2020/112164, mailed on May 17, 2021—10 pages.
3GPP. "Study on supporting Unmanned Aerial Systems (UAS) Connectivity, Identification and Tracking (Release 17)" 3GPP TR 23.754 V0.2.0 (Jun. 2020)—.83 pages.

Huawei et al. "Solution to UAV Remote Identification and Tracking" SA WG2 Meeting #136AH S2-2001725, Jan. 13-17, 2020—4 pages.
Oppo."KI#4, Sol#13: Update to remove ENs", SA WG2 Meeting #140E S2-2005692, Aug. 19-Sep. 1, 2020—3 pages.
Oppo, et al."KI#4, Merge of Solution 1, 13, 14, 15,16", SA WG2 Meeting #140E S2-2005693r09, Aug. 19-Sep. 1, 2020—5 pages.
Qualcomm incorporated, "KI#1, KI#2, KI#3, K##7, Sol. 5: Update to eliminate editor's notes, clarify additional aspects, and merge in other solutions"SA WG2 Meeting #140E S2-2005840,Aug. 19-Sep. 1, 2020—19 pages.
First Office Action of the Chinese application No. 202310647771.9, issued on Aug. 24, 2024. 21 pages with English translation.
Supplementary European Search Report in the European application No. 20950803.5, mailed on Jun. 20, 2023, 9 pages.
3GPP TS 33.401 V8.1.0 (Sep. 2008), "3rd Generation Partnership Project;Technical Specification Group Services and System Aspects;3GPP System Architecture Evolution (SAE):Security architecture;(Release 8)", cited in p. 13-40, 54 pages.
3GPP TS 33.401 V11.0.1 (Jun. 2011), "3rd Generation Partnership Project; Technical Specification Group Services and System Aspects;3GPP System Architecture Evolution (SAE);Security architecture (Release 11)", cited in p. 10-44, 115 pages.
First Office Action of the Singaporean application No. 11202261703Y, issued on Oct. 20, 2025, 11 pages.

* cited by examiner

UAV application

UAV

UAV controller

UAV application

UAV

UAV controller

3GPP mobile network

Application data link

Application data link

Application data link

UTM

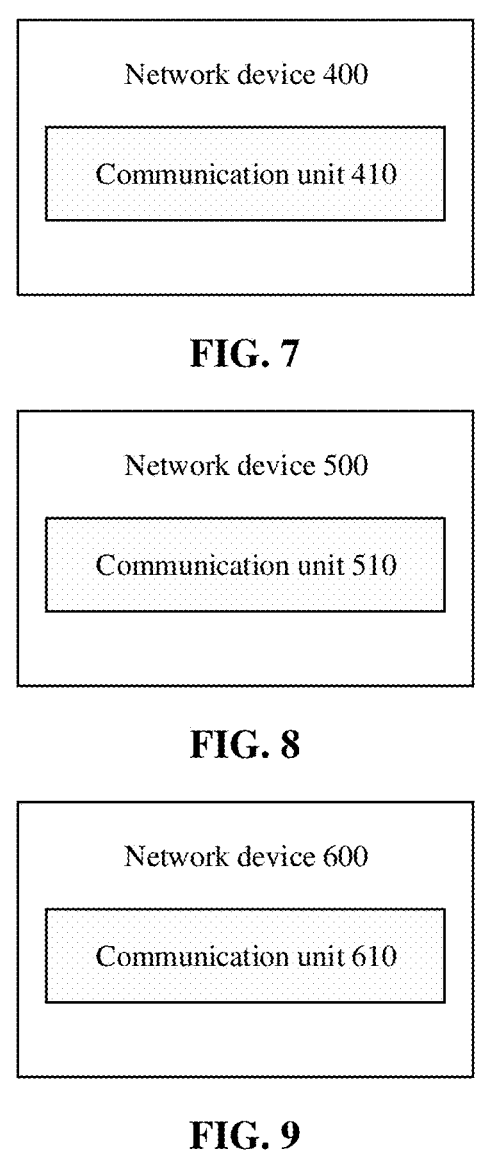

Network device 400

Communication unit 410

FIG. 7

Network device 500

Communication unit 510

FIG. 8

Network device 600

Communication unit 610

FIG. 9

METHOD FOR WIRELESS COMMUNICATION AND NETWORK DEVICE

CROSS-REFERENCE TO RELATED APPLICATION

This is a continuation application of International Patent Application No. PCT/CN2020/112164, filed on Aug. 28, 2020, entitled "METHOD FOR WIRELESS COMMUNICATION AND NETWORK DEVICE", the disclosure of which is hereby incorporated by reference in its entirety.

BACKGROUND

With the development of mobile communication technology, the terminal device accessing the 3rd generation partnership project (3GPP) network has not been limited to handheld terminal device. More and more machines and devices, such as unmanned aerial vehicle (UAV) will also use wireless communication networks.

During the flight of UAV, unmanned aerial system traffic management (UTM), UAS service supplier (USS) or third party authorized entity (TPAE), such as UAV controller belonging to public security system, may need to identify the identity of UAV flying in a specific area. Therefore, how to support the query of a terminal list within a specific area is an urgent problem to be solved.

SUMMARY

The embodiments of the present disclosure relate to the communication field, in particular to a method for wireless communication and a network device. The embodiment of the present disclosure provides a method for wireless communication and a network device.

According to a first aspect of the disclosure, there is provided a method for wireless communication. The method includes that: a first network device receives a first message from a query device, the first message including first area information, and the first message being used to request querying a terminal within a first area indicated by the first area information; and the first network device transmits a target terminal list within the first area to the query device.

According to a second aspect of the disclosure, there is provided a method for wireless communication. The method includes that: a third network device receives a fifth message from a first network device, the fifth message including first area information, and the fifth message being used to request querying a terminal within a first area indicated by the first area information; and the third network device transmits a third terminal list to the first network device, the third terminal list including a terminal within the first area.

According to a third aspect of the disclosure, there is provided a method for wireless communication. The method includes that: a second network device receives an eighth message, the eighth message including second area information, and the eighth message being used to request querying a terminal within a second area indicated by the second area information.

According to a fourth aspect of the disclosure, there is provided a network device. The network device is configured to execute the method in the above first aspect or any possible implementation of the first aspect. Specifically, the terminal device includes units for executing the method in the above first aspect or any possible implementation of the first aspect.

According to a fifth aspect of the disclosure, there is provided a network device. The network device is configured to execute the method in the above second aspect or any possible implementation of the second aspect. Specifically, the network device includes units for executing the method in the above second aspect or any possible implementation of the second aspect.

According to a sixth aspect of the disclosure, there is provided a network device. The network device is configured to execute the method in the above third aspect or any possible implementation of the third aspect. Specifically, the network device includes units for executing the method in the above third aspect or any possible implementation of the third aspect.

According to a seventh aspect of the disclosure, there is provided a network device, including a processor and a memory. The memory is configured to store a computer program, and the processor is configured to call and run the computer program stored in the memory to execute the above method of the first aspect to third aspect or implementations thereof.

According to an eighth aspect of the disclosure, there is provided a chip, which is configured to execute a method in any of the first aspect to third aspect or implementations thereof. Specifically, the chip includes a processor, which is configured to call and run a computer program in a memory to cause a device equipped with the chip to execute the method in any of the first aspect to third aspect or implementations thereof.

According to a ninth aspect of the disclosure, there is provided a computer-readable storage medium. The computer-readable storage medium is configured to store a computer program that causes a computer to execute the method in any of the first aspect to third aspect or implementations thereof.

According to a tenth aspect of the disclosure, there is provided a computer program product. The computer program product includes computer program instructions that cause a computer to execute the method in any of the first aspect to third aspect or implementations thereof.

According to an eleventh aspect of the disclosure, there is provided a computer program that, when running on a computer, causes a computer to execute the method in any of the first aspect to third aspect or implementations thereof.

BRIEF DESCRIPTION OF THE DRAWINGS

FIG. 7 is a schematic block diagram of a network device provided by an embodiment of the present disclosure.

FIG. 8 is a schematic block diagram of another network device provided by an embodiment of the present disclosure.

FIG. 9 is a schematic block diagram of yet another network device provided by an embodiment of the present disclosure.

DETAILED DESCRIPTION

The technical solution of the embodiments of the present disclosure will be described below in conjunction with the drawings in the embodiments of the present disclosure. It is apparent that the described embodiments are part of the embodiments of the present disclosure, but not all of them. Based on the embodiments in the present disclosure, all other embodiments obtained by those skilled in the art without making creative efforts fall within the scope of protection of the present disclosure.

The embodiment of the disclosure can be applied to various communication systems. For example, global system of mobile communication (GSM) system, code division multiple access (CDMA) system, wideband code division multiple access (WCDMA) system, general packet radio service (GPRS), long term evolution (LTE) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UMTS), wireless local area network (WLAN), wireless fidelity (WiFi), next generation communication system or other communication systems.

Generally speaking, conventional communication systems support a limited number of connections and are easy to implement. However, with the development of communication technology, mobile communication systems will not only support conventional communication, but also support, for example, device to device (D2D) communication, machine to machine (M2M) communication, machine type communication (MTC), vehicle to vehicle (V2V) communication, etc. Embodiments of the present disclosure can also be applied to these communication systems.

Optionally, the communication system in the embodiment of the present disclosure can be applied to a carrier aggregation (CA) scenario, a dual connectivity (DC) scenario, and a standalone (SA) network distribution scenario.

Embodiments of the present disclosure are not limited to the spectrum to be applied. For example, embodiments of the present disclosure may be applied to licensed spectrum or unlicensed spectrum.

Figures 1, 2:
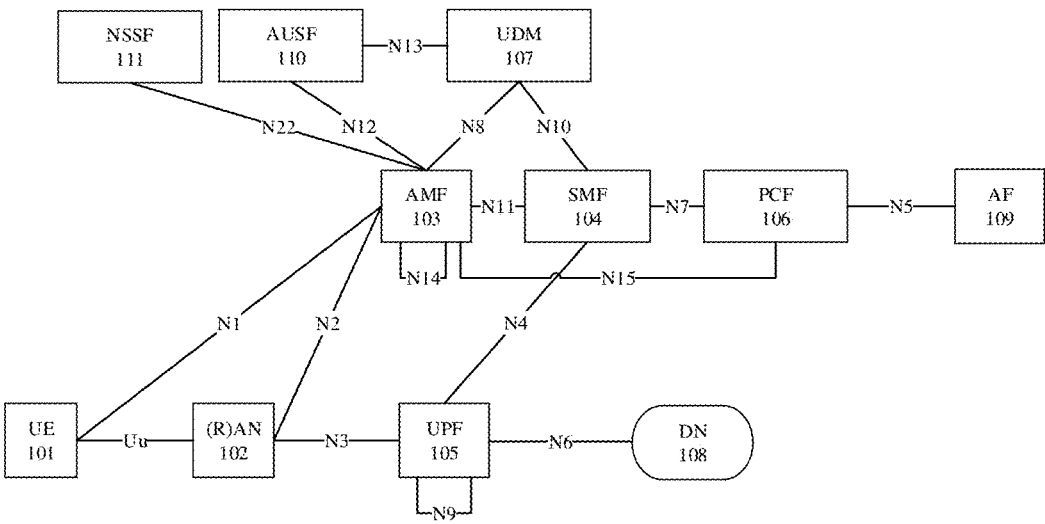
FIG. 1 is a schematic diagram of a communication system architecture provided by an embodiment of the present disclosure.
FIG. 2 is a schematic diagram of an unmanned aerial vehicle control provided by an embodiment of the present disclosure.

FIG. 1 exemplarily illustrates a schematic diagram of a communication system 100 to which the present disclosure is applied. As illustrated in FIG. 1, the communication system 100 mainly includes a user equipment (UE) 101, an access network (AN) device 102, an access and mobility management function (AMF) entity 103, a session management function (SMF) entity 104, a user plane function (UPF) entity 105, a policy control function (PCF) entity 106, a unified data management (UDM) entity 107, a data network (DN) 108, and an application function (AF) entity 109, an authentication server function (AUSF) entity 110, a network slice selection function (NSSF) entity 111.

Specifically, in the communication system 100, the UE 101 performs access layer connection with the AN device 102 through the Uu interface to exchange access layer messages and transmit the wireless data. The UE 101 performs non-access stratum (NAS) connection with the AMF entity 103 through an N1 interface to exchange NAS messages. The AN device 102 is connected to the AMF entity 103 through an N2 interface, and the AN device 102 is connected to the UPF entity 105 through an N3 interface. A plurality of UPF entities 105 are connected with each other through an N9 interface, the UPF entity 105 is connected with the DN 108 through an N6 interface, and the UPF entity 105 is connected with the SMF entity 104 through an N4 interface. The SMF entity 104 is connected to the PCF entity 106 through an N7 interface, the SMF entity 104 is connected to the UDM entity 107 through an N10 interface, the SMF entity 104 controls the UPF entity 105 through an N4 interface and the SMF entity 104 is connected to the AMF entity 103 through an N11 interface. A plurality of AMF entities 103 are connected through an N14 interface, the AMF entity 103 is connected with a UDM entity 107 through an N8 interface, the AMF entity 103 is connected with an AUSF entity 110 through an N12 interface, the AMF entity 103 is connected with an NSSF entity 111 through an N22 interface, and the AMF entity 103 is connected with a PCF entity 106 through an N15 interface. The PCF entity 106 is connected to the AF entity 109 through an N5 interface. The AUSF entity 110 is connected to the UDM entity 107 through an N13 interface.

In the communication system 100, the UDM entity 107 is a subscription database in the core network and stores subscription data of the user in the 5G network. The AMF entity 103 is a mobility management function in the core network, and the SMF entity 104 is a session management function in the core network. The AMF entity 103 is responsible for forwarding messages related to session management between the UE 101 and the SMF entity 104 in addition to performing mobility management for the UE 101. The PCF entity 106 is a policy management function in the core network, and is responsible for formulating policies related to mobility management, session management, billing, and the like for the UE 101. The UPF entity 105 is a user plane function in the core network and performs data transmission with the external data network through the N6 interface and with the AN device 102 through the N3 interface. After the UE 101 accesses the 5G network through the Uu interface, a protocol data unit (PDU) session data connection between the UE 101 and the UPF entity 105 is established under the control of the SMF entity 104, thereby performing data transmission. AMF entity 103 and SMF entity 104 acquire user subscription data from UDM entity 107 through N8 interface and N10 interface respectively, and acquire policy data from PCF entity 106 through N15 interface and N7 interface.

In addition, the communication system 100 also has a network explosion function (NEF) entity for interfacing with a third-party application server to transfer information between a core network node and a third-party application.

It should be noted that the above communication system 100 is described by taking a 5G communication system as an example. Of course, the present disclosure can also be applied to other 3GPP communication systems, such as 4G communication systems or future 3GPP communication systems, and the present disclosure is not limited thereto.

It should be understood that a device having a communication function in a network/system in embodiments of the present disclosure may be referred to as a communication device.

Embodiments of the present disclosure are described in connection with a network device and a terminal device, the terminal device may refer to a user equipment, an access terminal, a subscriber unit, a subscriber station, a mobile station, a remote station, a remote terminal, a mobile device, a user terminal, a terminal, a wireless communication device, a user agent, or a user device. The terminal device may be a station (ST) in the WLAN, it may be a cellular phone, a cordless phone, a session initiation protocol (SIP) telephone, wireless local loop (WLL) station, a personal digital assistant (PDA) device, a handheld device with wireless communication function, a computing device or other processing device connected to wireless modem, an in-vehicle device, a wearable device, a next-generation communication system such as a terminal device in an NR network, or the terminal device in the future evolved public land mobile network (PLMN) network, etc.

By way of example and not limitation, in embodiments of the present disclosure, the terminal device may also be a wearable device. A wearable device can also be called wearable intelligent device, which is the general name of wearable devices developed by applying wearable technology to intelligently design daily wear, such as glasses, gloves, watches, clothing and shoes. The wearable device is a portable device that is worn directly on the body or integrated into the user's clothes or accessories. The wearable device is not only a kind of hardware device, but also realizes powerful functions through software support, data interaction and cloud interaction. Generalized wearable smart devices include full functions and large size, which can realize complete or partial functions without relying on smart phones, such as smart watches or smart glasses, and only focus on certain application functions, which need to be used in conjunction with other devices such as smart phones, such as various smart bracelets and smart jewelry for monitoring physical signs.

The AN device 102 may be a device for communicating with a mobile device, the AN device 102 can be an access point (AP) in WLAN, a base transceiver station (BTS) in GSM or CDMA, a nodeB (NB) in WCDMA, an evolutional node B (eNB or eNodeB) in LTE, a relay station or an access point, or an in-vehicle device, a wearable device, a gNB in NR network or a network device in future evolved PLMN network, etc.

In an embodiment of that present disclosure, the network device provides services for a cell, the terminal device communicates with the network device through transmission resources (e.g. frequency domain resources, or spectrum resources) used by the cell, the cell may be a cell corresponding to a network device (e.g. a base station), the cell can belong to macro base station or the base station corresponding to small cell. The small cell can include metro cell, micro cell, pico cell, femto cell, etc. These small cells have the characteristics of small coverage and low transmission power, and are suitable for providing high-speed data transmission services.

It should be understood that the terms "system" and "network" in the present disclosure are often used interchangeably herein. In the present disclosure, the term "and/or" is merely an association relationship that describes an associated object and means that there may be three relationships, for example, A and/or B, which may mean that there are three situations: A alone, A and B at the same time, and B alone. In addition, the character "/" in the present disclosure generally means that the associated object is an "or" relationship.

It should be understood that the term "indicate" in embodiments of the present disclosure may be a direct indication, may be an indirect indication, or may indicate an association relationship. For example, A indicates B, which can mean that A directly indicates B, for example, B can be obtained through A. It can also mean that A indirectly indicates B, for example, A indicates C, and B can be obtained through C. It can also indicate that there is an association relationship between A and B.

In the description of embodiments of the present disclosure, the term "correspond" may mean that there is a direct correspondence relationship or an indirect correspondence relationship between the two, may also mean that there is an association relationship between the two, may also be a relationship between indicating and being indicated, configuring and being configured, etc.

With the development of mobile communication technology, the terminal device accessing the 3rd generation partnership project (3GPP) mobile communication network has not been limited to handheld terminal device. More and more machines and devices, such as UAVs, will also become a wide range of wireless communication network usage scenarios. The UAV and other devices are also connected as terminal devices when accessing the 3GPP network. As illustrated in FIG. 2, after accessing the 3GPP network, the UAV can establish a connection with the unmanned aerial system traffic management (UTM) through the 3GPP network. The UTM is responsible for the management functions such as registration and location tracking of UAV, and can control the behavior of UAV such as flight route. After the UAV is connected to the 3GPP network, it can also establish a connection with the UAV controller through the 3GPP network, and the UAV controller controls the behavior of the UAV.

During the flight of UAV, UTM, USS or third party authorized entity (TPAE), such as UAV controller belonging to public security system, may need to identify the identity of UAV flying in a specific area. Therefore, how to support the query of a UE list within a specific area is an urgent problem to be solved.

Figure 3:
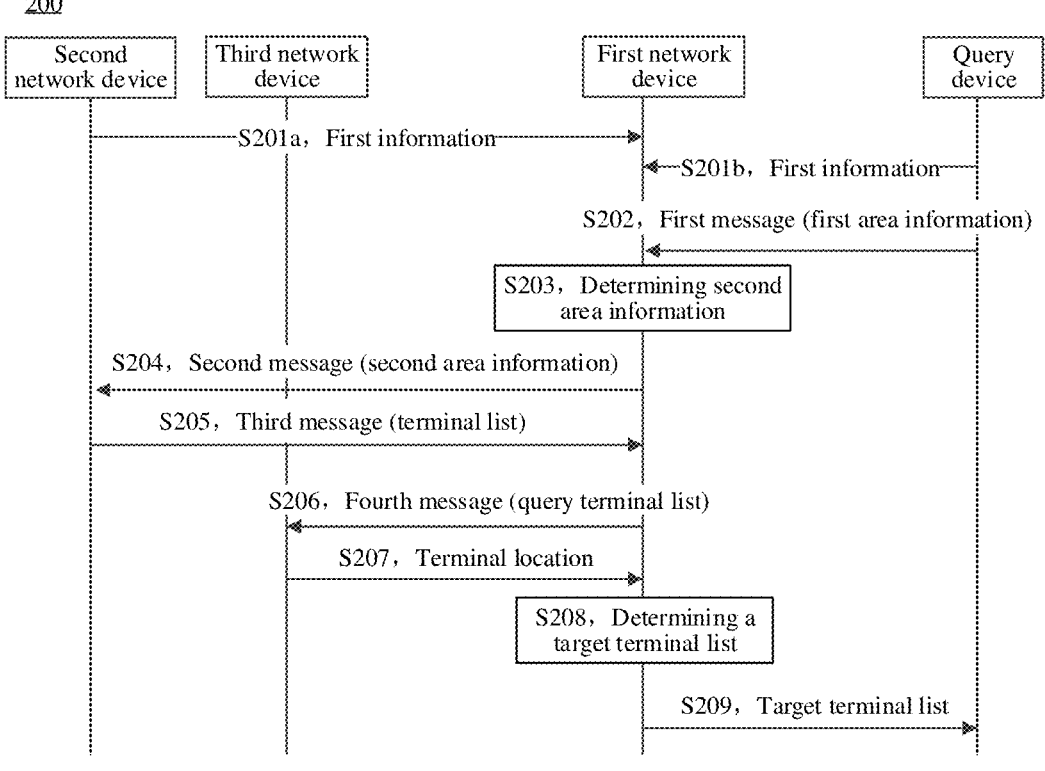
FIG. 3 is a schematic interaction diagram of a method for wireless communication provided by an embodiment of the present disclosure.

FIG. 3 is a schematic interaction diagram of a method 200 of wireless communication provided by an embodiment of the present disclosure. As illustrated in FIG. 3, the method 200 may include at least some of the following operations.

At S202, a first network device receives a first message from a query device, the first message including first area information, and the first message being used to request querying a terminal within a first area indicated by the first area information.

Optionally, in embodiments of the present disclosure, the first network device may be an existing network device. For example, the network explosion function (NEF) entity, that is, the function of the first network device in the embodiment of the present disclosure can be added to the existing network device, or the newly added function entity can be used to interface with the third-party application server to transmit information between the core network node and the third-party application, which is not limited in the present disclosure.

Optionally, the signaling interaction may be directly performed between the first network device and the query device, or may be performed through other devices. For example, if the first network device is not a NEF entity, the signaling interaction may be performed through a NEF entity between the first network device and the query device. Specifically, the query device may send the first area information to the NEF entity, which forwards the first area information to the first network device.

Optionally, the first message may be used to request querying a terminal list within a specific area, here the terminal may be an ordinary terminal, such as the various terminal types described in the previous embodiments, or may be other types of terminal, such as mechanical device, such as UAV, etc., and the present disclosure is not limited thereto.

Optionally, the query device may be any device having an authority to query location of the terminal, such as UTM, USS, TPAE, etc., and the present disclosure is not limited thereto.

Optionally, in some embodiments, the method 200 further includes the following operation.

The first network device acquires first information, the first information including information of at least one specific terminal. The first information may be used to determine a specific terminal list to be reported when the query device wants to query a specific terminal in the first area.

For example, at S201a, the first network device may acquire the first information from the query device.

For another example, at S201b, the first network device may acquire the first information from a second network device, the function of which will be described in detail below and will not be described here.

As a specific implementation, the first network device may acquire the first information from the second network device or the query device during a process of registering to the 3GPP network, or may acquire the first information from the second network device or the query device after the process of registering to the 3GPP network.

Optionally, the second network device or the query device may transmit the first information based on the request of the first network device, or may actively transmit the first information to the first network device, which is not limited herein.

Optionally, in some embodiments, the first information includes at least one of the following:

identification information of a plurality of specific terminals;

type information of the plurality of specific terminals;

slice information to which the plurality of specific terminals belong;

network information to which the plurality of specific terminals belong;

information of a query device corresponding to the plurality of specific terminals.

Optionally, the identification of the specific terminal may include, for example, at least one of the following:

an identification assigned by the 3GPP network to the specific terminal, such as a subscription permanent identifier (SUPI) or a generic public subscription identifier (GPSI);

an identification of the specific terminal outside the 3GPP network, such as an identification of the specific terminal in an aviation management system;

a mapping relationship of identifies of the specific terminal inside and outside the 3GPP network.

Optionally, the type information of the terminal device may be, for example, an ordinary terminal, a non-ordinary terminal, a mechanical device such as the UAV.

Optionally, slice information to which the specific terminal belongs, for example, slice identification (Slice ID), single network slice selection assistance information (S-NS-SAI), network slice selection assistance information (NS-SAI), and the like.

Optionally, the network information to which the plurality of specific terminals belong is such as a data network name (DNN) to which the terminal is accessed and the like.

Optionally, the information of the query device corresponding to the specific terminal includes identification information or address information of the query device that the specific terminal belongs to or is registered with, and/or identification information or address information of the query device having an authority to manage or query the specific terminal.

Optionally, in some embodiments, the method 200 further includes the following operation.

At S203, the first network device determines second area information according to the first area information, and the second area information may be area information defined by the 3GPP network.

As an example, in response to that the first area information is area information defined by a 3GPP network, the first area information is determined as the second area information. For example, the first area information may be a cell identification, a tracking area (TA) identification, in which case the first area information may be determined as the second area information.

As another example, in response to that the first area information is not the area information defined by the 3GPP network and the first area information is capable of being mapped to the area information defined by the 3GPP network, area information that is defined by the 3GPP network and mapped by the first area information is determined as the second area information. For example, the first area information is a coarse-grained area identification such as a country or a city, in which case the first area information may be mapped to one or more pieces of area information defined by the 3GPP network. Thus, one or more pieces of area information defined by the 3GPP network to which the first area information is mapped may be determined as the second area information.

As yet another example, in response to that the first area information is not the area information defined by the 3GPP network and the first area information is not capable of being mapped to the area information defined by the 3GPP network, area information that includes the first area and is defined by the 3GPP network may be determined as the second area information. For example, the first area information is a finer-grained area identification, a specific airport, a street block, or an area bounded by a certain road, or an area range marked by latitude and longitude. In this case, the first area may be mapped to a second area including the first area, for example, the first area is a street block, and the mapped second area is, for example, a TA including the street block, and the range of the TA being larger than the range of the street block.

Further, in some embodiments, the method 200 further includes the following operations.

At S204, a first network device transmits a second message to a second network device, the second message including the second area information, and the second message being used to request querying a terminal within the second area indicated by the second area information.

Optionally, the second network device may be a network device that can query a terminal list within a certain area, for example, an access and mobility management function (AMF) entity, etc.

At S205, the first network device receives a third message replied by the second network device, the third message including a first terminal list, and the first terminal list including the terminal within the second area.

In some embodiments, the first terminal list may include one or more terminal identifications, for example, the terminal identifications may be SUPI or GPSI, etc., and the present disclosure is not limited thereto.

Optionally, in some embodiments, the third message may further include a second terminal list, and the second terminal list includes a terminal that may be within the second area. For example, the terminal that may be within the second area includes a terminal that is in an idle state and whose registration area intersects with the second area.

In some embodiments, the second terminal list may also include one or more terminal identifications such as SUPI or GPSI and the like, and the present disclosure is not limited thereto.

Optionally, in some embodiments, the method 200 further includes the following operation.

At S206, the first network device transmits a fourth message to a third network device, the fourth message including a query terminal list, and the fourth message being used to request querying location information of a terminal in the query terminal list.

In some embodiments, if the second terminal list is included in the third message, or the first area and the second area are different, for example, the second area is larger than the first area. In this case, the specific location of the terminal in the first terminal list and/or the second terminal list can be further determined to the third network device.

Optionally, the third network device may be a network device having location information of the query terminal, for example, a gateway mobile location centre (GMLC) or the like, and the present disclosure is not limited thereto.

In some embodiments, the query terminal list may include part or all of the terminal list received by the first network device in the third message.

As an example, the query terminal list may include the second terminal list. That is, the first network device may determine the location of the terminal in the second terminal list only from the third network device.

As another example, the query terminal list includes all terminal lists received in the third message.

For example, the query terminal list includes a first terminal list, in which case the third message may include only the first terminal device.

As another example, the query terminal list includes the first terminal list and the second terminal list, in which case the third message may include the first terminal list and the second terminal list.

In other embodiments, before the first network device transmits the query terminal list to the third network device, the first network device may first screen out the terminal whose identity is a specific terminal according to the terminal list in the third message combined with the first information, and further query only the location information of the specific terminal from the third network device.

In some scenarios, if the query device wants to query the specific terminal within the first area, in this case, in order to reduce the query load of the third network device, the first network device can first screen out the specific terminal according to the first information, and further query only the location information of the specific terminal from the third network device.

As an example, the query terminal list may include a terminal determined according to the second terminal list and first information. That is, only specific terminals in the second terminal list can be screened for location query. In other words, the query terminal list includes an intersection of the second terminal list and at least one specific terminal included in the first information.

As yet another example, the query terminal list includes a terminal determined according to the all terminal lists received at S205 and combining first information. For example, the query terminal list includes an intersection of the first terminal list and at least one specific terminal included in the first information. As another example, the query terminal list includes an intersection of: the union of the first terminal list and the second terminal list, and at least one specific terminal included in the first information. That is, the query terminal list includes a specific terminal in the first terminal list and a specific terminal in the second terminal list.

In some embodiments, the query terminal list may also include one or more terminal identifications such as SUPI or GPSI and the like, and the present disclosure is not limited thereto.

Optionally, in some embodiments, the method 200 further includes the following operation.

At S207, the first network device receives location information of the terminal in the query terminal list replied by the third network device.

For example, the third network device may determine a specific location of a terminal in the query terminal list based on a location service (LCS) mechanism.

Further, in some embodiments, the method 200 further includes the following operation.

At S208, the first network device determines a target terminal list.

In some embodiments of the disclosure, the first network device may determine the target terminal list based on the terminal list included in the third message.

First case: the third message may include only the first terminal list.

In this case, the first network device may determine a target terminal list according to the first terminal list.

As an example, the first terminal list is determined as the target terminal list.

As another example, the target terminal list is determined according to location information of a terminal in the first terminal list and the first area information. For example, the target terminal list includes a terminal within the first area in the first terminal list. The location information of the terminal in the first terminal list may be determined at S206.

As yet another example, the target terminal list is determined according to location information of a terminal in the first terminal list, the first area information and a query authority of the query device. For example, the target terminal list includes a terminal that is within the first area in the first terminal list and for which the query device has a query authority.

The location information of the terminal in the first terminal list may be determined at S206.

Second case: the third message includes the first terminal list and the second terminal list.

In this case, the first network device may determine a target terminal list according to the first terminal list and the second terminal list.

As an example, the first terminal list and the second terminal list are determined as the target terminal list.

As another example, the target terminal list is determined according to the first terminal list, the second terminal list, location information of a terminal in the second terminal list and combining the first area information. For example, the target terminal list includes a terminal within the first area in the first terminal list and a terminal within the first area in the second terminal list.

As yet another example, the target terminal list is determined according to the first terminal list, the second terminal list, location information of a terminal in the first terminal list, location information of a terminal in the second terminal list and combining the first area information. For example, the target terminal list includes a terminal within the first area in the first terminal list and a terminal within the first area in the second terminal list.

As yet another example, the target terminal list is determined according to the first terminal list, the second terminal list, location information of a terminal in the second terminal list and combining the first area information and a query authority of the query device. For example, the target terminal list includes a terminal that is within the first area in the first terminal list and for which the query device has the query authority, and includes a terminal that is within the first area in the second terminal list and for which the query device has the query authority.

As yet another example, the target terminal list is determined according to the first terminal list, the second terminal list, location information of a terminal in the first terminal list, location information of a terminal in the second terminal list and combining the first area information and a query authority of the query device. For example, the target terminal list includes a terminal that is within the first area in the first terminal list and for which the query device has the query authority, and includes a terminal that is within the first area in the second terminal list and for which the query device has the query authority.

In other embodiments of the disclosure, the first network device may determine the target terminal list based on the terminal list included in the third message and the first information.

First case: the third message may include only the first terminal list.

In this case, the first network device may determine a target terminal list according to the first terminal list and the first information.

As an example, the target terminal list may be an intersection of the first terminal list and at least one specific terminal of the first information. That is, the target terminal list includes at least one first type terminal, the first type terminal being included in the first terminal list and being included in the at least one specific terminal of the first information.

As yet another example, the target terminal list is determined by the first network device according to the first terminal list, location information of a terminal in the first terminal list and combining the first area information. For example, the target terminal list includes a terminal within the first area in an intersection of the first terminal list and at least one specific terminal of the first information.

As yet another example, the target terminal list is determined by the first network device according to the first terminal list, location information of a terminal in the first terminal list, the first information and a query authority of the query device. For example, the target terminal list includes a terminal that is within the first area in an intersection of the first terminal list and at least one specific terminal of the first information and for which the query device has the query authority.

Second case: the third message includes the first terminal list and the second terminal list.

In this case, the first network device may determine a target terminal list according to the first terminal list and the second terminal list and combining the first area information.

As an example, an intersection of the first terminal list, the second terminal list and at least one terminal in the first information is determined as the target terminal list.

As another example, the target terminal list is determined according to the first terminal list, the second terminal list, location information of a terminal in the second terminal list and combining the first area information and the first information. For example, the target terminal list includes at least one terminal within the first area in an intersection of the first terminal list, the second terminal list and at least one specific terminal of the first information.

As yet another example, the target terminal list is determined according to the first terminal list, the second terminal list, location information of a terminal in the first terminal list, location information of a terminal in the second terminal list and combining the first area information and the first information. For example, the target terminal list includes at least one terminal within the first area in an intersection of the first terminal list, the second terminal list and at least one specific terminal of the first information.

As yet another example, the target terminal list is determined according to the first terminal list, the second terminal list, location information of a terminal in the second terminal list and combining the first area information and a query authority of the query device. For example, the target terminal list includes at least one terminal that is within the first area in an intersection of the first terminal list, the second terminal list and at least one specific terminal of the first information and for which the query device has the query authority.

As yet another example, the target terminal list is determined according to the first terminal list, the second terminal list, location information of a terminal in the first terminal list, location information of a terminal in the second terminal list and combining the first area information and a query authority of the query device. For example, the target terminal list includes at least one terminal that is within the first area in an intersection of the first terminal list, the second terminal list and at least one specific terminal of the first information and for which the query device has the query authority.

In summary, the first network device may determine the target terminal list according to at least one of the first terminal list, the second terminal list, location information of the terminal in the query terminal list, the first information, and the query authority of the query device.

The terminal in the target terminal list satisfies at least one of the following conditions:

the terminal is included in the first terminal list;

the terminal is included in the second terminal list;

the terminal is included in at least one specific terminal in the first information;

the terminal is within the first area;

the query device has the query authority for the terminal.

Further, in some embodiments, the method 200 further includes the following operation.

At S209, the first network device transmits the target terminal list to the query device.

Thus, the first network device may query the terminal list within the specific area through the second network device when receiving the query request of the query device to the terminal within the specific area, and further report the terminal list within the specific area to the query device, thereby realizing the query demand for the terminal within the specific area.

Figure 4:
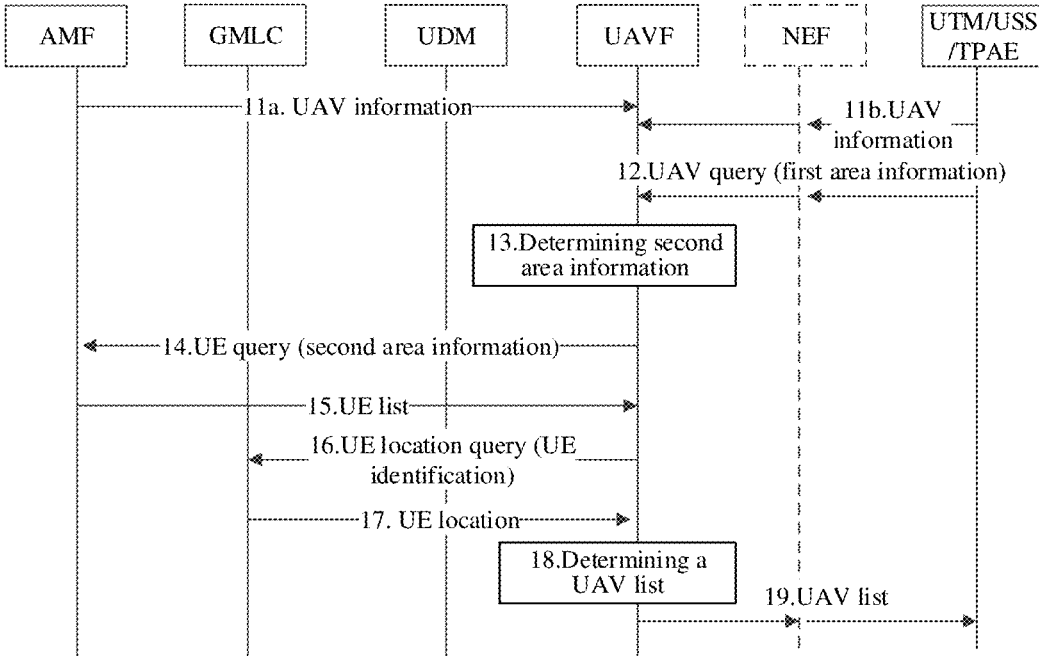
FIG. 4 is a schematic interaction diagram of a specific implementation of the embodiment illustrated in FIG. 3.

With reference to FIG. 4, taking the first network device as an UAVF entity or a UAV support function entity, the second network device as an AMF entity, the third network device as a GMLC entity, and the query device as a UTM, USS or TPAE as an example, the query manner of UAV within a specific area is explained.

At operation 11, the UAVF in the 3GPP network acquires UAV information.

For example, the UAV information is acquired from the AMF during the UAV is registered to the 3GPP network, or the UAV information is acquired from the UTM or USS. Alternatively, after the UAV has been registered to the 3GPP network, the AMF or UTM or USS actively updates the UAV information to the UAVF. The above operations are illustrated in operation 11a or operation 11b in FIG. 4.

Optionally, the UAV information includes at least one of the following information:

the UAV identification, for example, an identification assigned to the UAV by the 3GPP network, such as SUPI or GPSI, or an identification of the UAV outside the 3GPP network, such as identifications of the UAV in the aviation management system, or a mapping relationship of these identifications;

the UTM and/or USS and/or TPAE information corresponding to the UAV, for example, information such as the identification or address of the UTM and/or USS and/or TPAE that the UAV belongs to or is registered with, or information such as the identification or address of the UTM and/or USS and/or TPAE having the authority to manage or query the UAV.

At operation 12, the UTM or USS or TPAE transmits a query request to the UAVF, the query request carrying the first area information to be queried. For example, UTM/USS/TPAE may signaling interact directly with UAVF or via NEF.

At operation 13, the UAVF determines the second area information, which is the area information defined by the 3GPP network.

For example, if the queried first area information received at operation 1 is the area information defined by the 3GPP network, such as cell identification, tracking area (TA) identification, the UAVF directly uses the received first area information as the second area information.

For another example, if the first area information at operation 1 can be mapped to information of one or more areas defined by the 3GPP network, for example, a coarser-grained area identification, such as a country or city, can generally be mapped to information of one or more areas defined by the 3GPP network, the UAVF maps the received first area information to second area information.

For another example, if the queried first area information received at operation 1 cannot be mapped to the area information defined by the 3GPP network, such as a finer-grained area identification, a specific airport, a street block, or an area bounded by a certain road, or an area range marked by latitude and longitude, the UAVF maps the received first area to a second area including the query area. For example, the first area is a street block, and the mapped second area is a TA including the street block, the TA range being larger than the range of the street block.

At operation 14, the UAVF transmits a query request to the AMF, the query request carrying the second area information to be queried and indicating the AMF to query the UE list in the area.

At operation 15, the AMF feeds back the UE list information in the area to the UAVF.

Optionally, information of UE list that may be within the area is also included, such as information of UE list that is in an idle state and the UE registration area includes the second area. The information of UE list includes one or more UE identifications, and the UE identifications can be SUPI, GPSI and other identifications.

At operation 16, the UAVF determines a UE list requiring further location query. The UE list may be, for example, a UE list received at operation 15 that may be within the area, or a UE list identified as a UAV by comparing this list with the UAV information at operation 11. The UE list includes, for example, the entire UE lists received at operation 15, or a UE list identified as a UAV is determined by comparing this list with the UAV information at operation 11.

Optionally, one or more UE identifications are included in the UE list for performing the location query, and the UE identifications may be identifications such as SUPI, GPSI, etc. The UAVF can transmit the UE list that needs location query to the GMLC for the location query, and can also transmit each of UE identifications in the whole received list to the GMLC for the query.

At operation 17, the UAVF acquires the specific location of the queried UE from the GMLC.

It should be understood that operation 16 and operation 27 are optional.

At operation 18, the UAVF determines the UAV list that needs feedback.

The feedback UAV list is determined, for example, according to at least one of the following:

comparing the UE identification received at operation 15 with the UAV information at operation 11 to identify the UAV;

comparing the UE identification received at operation 15 with the UAV information at operation 11 to identify the UAV for which the query party has the query authority;

comparing the UE and location information acquired at operation 17 with the first area information and the UAV information at operation 11 to identify the UAV in the first area information;

comparing the UE and location information acquired at operation 17 with the first area information and the UAV information at operation 11 to identify the UAV that is within the first area information and for which the query party has the query authority.

At operation 29, the UAVF feeds back the UAV list to the UTM/USS/TAPE of the query party.

If the UE identification or UAV identification at the above operation 11, operation 15, operation 16, and operation 18 need to be converted to each other and the UAVF itself cannot be converted, the UAVF can query other network elements, such as UDM, to convert the identification.

Figure 5:
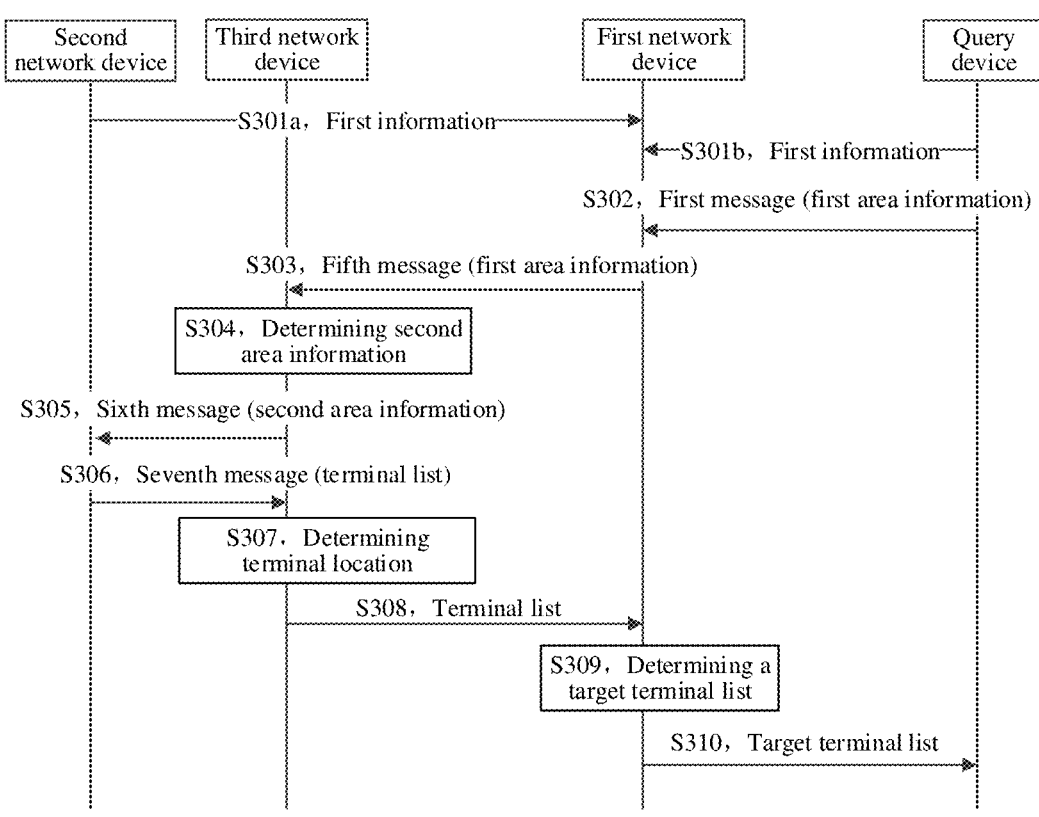
FIG. 5 is a schematic interaction diagram of another method for wireless communication provided by an embodiment of the present disclosure.

FIG. 5 is a schematic interaction diagram of a method 300 of wireless communication provided by another embodiment of the present disclosure. As illustrated in FIG. 5, the method 300 may include at least some of the following operations.

At S302, a first network device receives a first message from a query device, the first message including first area information, and the first message being used to request querying a terminal within a first area indicated by the first area information.

Optionally, in embodiments of the present disclosure, the first network device may be an existing network device. For example, the NEF entity, that is, the function of the first network device can be added to the existing network device, or the newly added function entity can be used to interface with the third-party application server to transmit information between the core network node and the third-party application, which is not limited in the present disclosure.

Optionally, the signaling interaction may be directly performed between the first network device and the query device, or may be performed through other devices. For example, if the first network device is not a NEF entity, the signaling interaction may be performed through a NEF entity between the first network device and the query device. Specifically, the query device may send the first area information to the NEF entity, which forwards the first area information to the first network device.

Optionally, the first message may be used to request querying a terminal list within a specific area, here the terminal may be an ordinary terminal, such as the various terminal types described in the previous embodiments, or may be other types of terminal, such as mechanical device, such as UAV, etc., and the present disclosure is not limited thereto.

As a specific example, the first message may be used to request querying a specific terminal within a specific area, and the specific terminal may be a mechanical device such as a UAV.

Optionally, the query device may be any device having an authority to query location of the terminal, such as UTM, USS, TPAE, etc., and the present disclosure is not limited thereto.

Optionally, in some embodiments, the method 300 further includes the following operation.

At S303, a first network device transmits a fifth message to a third network device, the fifth message including the first area information, and the fifth message being used to request querying the terminal within the first area.

Optionally, the third network device may be a network device having location information of the query terminal, for example, a GMLC or the like, and the present disclosure is not limited thereto.

At S304, the third network device determines second area information according to the first area information, and the second area information may be area information defined by the 3GPP network.

As an example, in response to that the first area information is area information defined by a 3GPP network, the first area information is determined as the second area information. For example, the first area information may be a cell identification, a tracking area (TA) identification, in which case the first area information may be determined as the second area information.

As another example, in response to that the first area information is not the area information defined by the 3GPP network and the first area information is capable of being mapped to the area information defined by the 3GPP network, area information that is defined by the 3GPP network and mapped by the first area information is determined as the second area information. For example, the first area information is a coarse-grained area identification such as a country or a city, in which case the first area information may be mapped to one or more pieces of area information defined by the 3GPP network. Thus, one or more pieces of area information defined by the 3GPP network to which the first area information is mapped may be determined as the second area information.

As yet another example, in response to that the first area information is not the area information defined by the 3GPP network and the first area information is not capable of being mapped to the area information defined by the 3GPP network, area information that includes the first area and is defined by the 3GPP network may be determined as the second area information. For example, the first area information is a finer-grained area identification, a specific airport, a street block, or an area bounded by a certain road, or an area range marked by latitude and longitude. In this case, the first area may be mapped to a second area including the first area, for example, the first area is a street block, and the mapped second area is, for example, a TA including the street block, and the range of the TA being larger than the range of the street block.

Further, in some embodiments, the method 300 further includes the following operations.

At S305, a third network device transmits a sixth message to a second network device, the sixth message including the second area information, and the sixth message being used to request querying a terminal within the second area indicated by the second area information.

Optionally, the second network device may be a network device to query a terminal list in a certain area, for example, an AMF entity, etc.

At S306, the third network device receives a seventh message replied by the second network device, the seventh message including a fourth terminal list, and the fourth terminal list including the terminal within the second area.

In some embodiments, the fourth terminal list may include one or more terminal identifications such as SUPI or GPSI and the like, and the present disclosure is not limited thereto.

Optionally, in some embodiments, the seventh message may further include a fifth terminal list, and the fifth terminal list includes a terminal that may be within the second area. For example, the terminal that may be within the second area includes a terminal that is in an idle state and whose registration area intersects with the second area.

In some embodiments, the fifth terminal list may also include one or more terminal identifications such as SUPI or GPSI and the like, and the present disclosure is not limited thereto.

Optionally, in some embodiments, the third network device may determine the fourth terminal list as a third terminal list that feeds back to the first network device.

In some scenarios, if an area indicated by the first area information and an area indicated by the second area information is the same, or the second area information is mapped from the first area information, the third network device may determine the fourth terminal list as the third terminal list.

Optionally, in some embodiments, the method 300 further includes the following operations.

At S307, the third network device determines a specific location in the terminal list included in the seventh message.

Optionally, the third network device may determine the specific location of the terminal based on the LCS mechanism.

Optionally, the third network device may determine only the specific location of the terminal in the fifth terminal list, or may also determine the specific location of the terminal in the fourth terminal list and the specific location of the terminal in the fifth terminal list.

Further, the third network device may determine the third terminal list according to the determined specific location of the terminal and combining the first area information.

As an example, the third network device determines the third terminal list according to the fourth terminal list, the fifth terminal list, location information of the terminal in the fifth terminal list and combining the first area information.

For example, the third terminal list includes a terminal within the first area in the fourth terminal list and a terminal within the first area determined according to location information of terminal in the fifth terminal list.

As another example, the third network device determines the third terminal list according to the fourth terminal list, location information of the terminal in the fourth terminal list, the fifth terminal list, location information of the terminal in the fifth terminal list and combining the first area information.

For example, the third terminal list includes a terminal within the first area determined according to location information of terminal in the fourth terminal list and a terminal within the first area determined according to location information of terminal in the fifth terminal list.

The location information of the terminal within the fourth terminal list and the location information of the terminal within the fifth terminal list may be determined at S307.

Further, at S308, the third terminal list is transmitted to the first network device.

Optionally, in some embodiments, the method 300 further includes the following operation.

At S309, the first network device determines a target terminal list according to the third terminal list.

As an example, the third terminal list is determined as the target terminal list.

In other embodiments, the first network device determines the target terminal list according to the third terminal list and combining the first information. For example, the target terminal list includes an intersection of the third terminal list and at least one specific terminal included in the first information.

In other embodiments, the first network device determines the target terminal list according to the third terminal list and combining the first information and a query authority of the query device.

For example, the target terminal list includes a terminal that is in an intersection of the third terminal list and at least one specific terminal in the first information and for which the query device has a query right.

Figure 6:
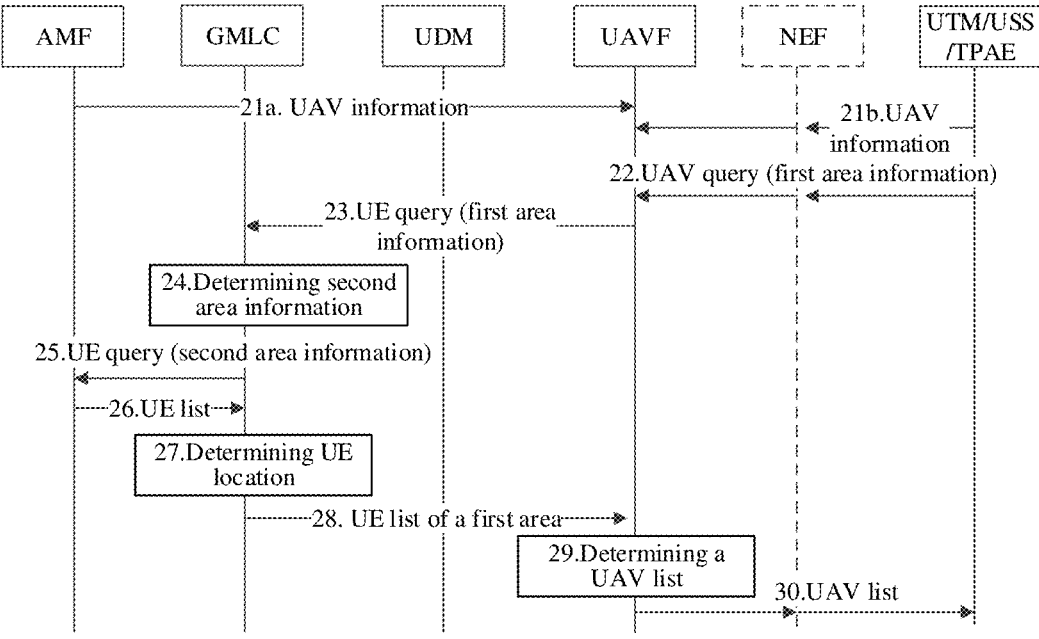
FIG. 6 is a schematic interaction diagram of a specific implementation of the embodiment illustrated in FIG. 5.

With reference to FIG. 6, taking the first network device as an UAVF entity or a UAV support function entity, the second network device as an AMF entity, the third network device as a GMLC entity, and the query device as a UTM, USS or TPAE as an example, the query manner of UAV within a specific area is explained.

Operation 21 and operation 22 are similar to operation 11 and operation 12 in the embodiment illustrated in FIG. 4 and will not be repeated here.

At operation 23, the UAVF transmits a query request to the GMLC, the query request carrying the first area information to be queried and indicating the DMLC to query the UE list in the area.

At operation 24, the GMLC determines the second area information, which is the area information defined by the 3GPP network.

If the queried first area information received at operation 23 is area information defined by the 3GPP network, such as cell identification, tracking area (TA) identification, or queried first area information is capable of being mapped to the area information defined by the one or more 3GPP network, a coarser-grained area identification, such as a country or city, can generally be mapped to the area information defined by the one or more 3GPP network. The GMLC directly uses the received first area information as the second area information or maps the received first area information to the second area information.

If the queried first area information received at operation 23 is not capable of being mapped to the area information defined by the 3GPP network, such as a finer-grained area identification, a specific airport, a street block, or an area bounded by a certain road, or an area range marked by latitude and longitude. The GMLC maps the received first area to a second area including the area. For example, the first area is a street block, and the mapped second area is a TA including the street block, the TA range being larger than the range of the street block.

At operation 25, the GMLC transmits a query request to the AMF, the query request carrying the second area information to be queried and indicating the AMF to query the UE list in the area.

At operation 26, the AMF feeds back the UE list information in the area to the GMLC.

Optionally, information of UE list that may be within the area is also included, such as information of UE list that is in an idle state and the UE registration area includes the second area. The information of UE list includes one or more UE identifications, and the UE identifications can be SUPI, GPSI and other identifications.

At operation 27, the GMLC uses the LCS location mechanism to determine the specific location of the UE, for example, the specific location of the UE in the UE list that is received at operation 26 and may be within the second area is determined, or the specific location of the UE in the UE list of all received at operation 26 is determined.

At operation 28, the GMLC determines a UE list within the first area according to the UE list acquired at operation 26 and the UE location determined at operation 27, and feeds back to the UAVF.

For example, if the second area is same to the first area or is directly mapped from the first area, the UE list acquired from the AMF at operation 26 is used as the UE list of the first area. If the UE list information possibly within the area is also included at operation 26, the UE list within the first area is determined according to comparing the specific location of the UE possibly within the second area acquired at operation 27 with the first area information. If the range of the second area is larger than the range of the first area, the UE list within the first area is determined according to comparing the specific location of all UEs of the second area acquired at operation 27 with the first area information.

At operation 29, the UAVF compares the UE list received at operation 28 with the UAV information at operation 21 to identify the UAV in the UE list or identify the UAV for which the query party has query authority.

At operation 30, the UAVF feeds back the UAV list to the UTM/USS/TAPE of the query party.

If the UE identification or UAV identification in the above operations need to be converted to each other and the GMLC or UAVF itself cannot be converted, the GMLC or UAVF can query other network elements, such as UDM, to convert the identification.

Thus, the first network device can query the terminal list in the specific area through the second network device when receiving the query request of the query device to the terminal within the specific area, and further report the terminal list within the specific area to the query device, thereby realizing the query demand for the terminal within the specific area.

The method embodiments of the present disclosure have been described in detail above with reference to FIG. 3 to FIG. 6, and the apparatus embodiments of the present disclosure have been described in detail below with reference to FIG. 7 to FIG. 11. It should be understood that the apparatus embodiments and the method embodiments correspond to each other, and similar descriptions may refer to the method embodiments.

FIG. 7 illustrates a schematic block diagram of a network device 400 according to an embodiment of the present disclosure. As illustrated in FIG. 7, the network device 400 includes a communication unit 410.

The communication unit 410 is configured to receive a first message from a query device, the first message including first area information, and the first message being used to request querying a terminal within a first area indicated by the first area information; and transmit a target terminal list within the first area to the query device.

Optionally, in some embodiments, the network device 400 further includes a processing unit. The processing unit is configured to determine second area information according to the first area information, the second area information being area information defined by 3rd generation partnership project (3GPP) network.

Optionally, in some embodiments, the processing unit is further configured to:

in response to that the first area information is area information defined by the 3GPP network, determine the first area information as the second area information; or in response to that the first area information is not the area information defined by the 3GPP network and the first area information is capable of being mapped to the area information defined by the 3GPP network, determine area information that is defined by the 3GPP network and mapped by the first area information as the second area information; or in response to that the first area information is not the area information defined by the 3GPP network and the first area information is not capable of being mapped to the area information defined by the 3GPP network, determine area information that includes the first area and is defined by the 3GPP network as the second area information.

Optionally, in some embodiments, the communication unit 410 is further configured to:

transmit a second message to a second network device, the second message including the second area information, and the second message being used to request querying a terminal within the second area indicated by the second area information.

Optionally, in some embodiments, the communication unit 410 is further configured to:

receive a third message replied by the second network device, the third message including a first terminal list, and the first terminal list including the terminal within the second area.

Optionally, in some embodiments, the network device 400 further includes a processing unit. The processing unit is configured to determine the target terminal list according to the first terminal list; or determine the target terminal list according to the first terminal list and first information, the first information including information of at least one specific terminal.

Optionally, in some embodiments, the target terminal list includes at least one first type terminal, and the first type terminal is included in the first terminal list and is included in the at least one specific terminal of the first information; or the target terminal list includes at least one second type terminal, the second type terminal is included in the first terminal list and is included in the at least one specific terminal of the first information, and the query device has a query authority for the second type terminal.

Optionally, in some embodiments, the third message further includes a second terminal list, and the second terminal list includes a terminal that may be within the second area.

Optionally, in some embodiments, the terminal that may be within the second area includes a terminal that is in an idle state and whose registration area intersects with the second area.

Optionally, in some embodiments, the communication unit 410 is further configured to:

transmit a fourth message to a third network device, the fourth message including a query terminal list, and the fourth message being used to request querying location information of a terminal in the query terminal list;

the query terminal list including at least one of the first terminal list or the second terminal list;

the query terminal list including a terminal determined according to the second terminal list and first information; or the query terminal list including a terminal determined according to the at least one of the first terminal list or the second terminal list and combining first information;

the first information includes information of at least one specific terminal.

Optionally, in some embodiments, the communication unit 410 is further configured to:

receive location information of the terminal in the query terminal list replied by the third network device.

Optionally, in some embodiments, the network device 400 further includes a processing unit.

The processing unit is configured to determine the target terminal list according to the query terminal list, the location information of the terminal in the query terminal list and combining the first area information if the query terminal list includes the terminal in the first terminal list; or determine the target terminal list according to the first terminal list, the query terminal list, the location information of the terminal in the query terminal list and combining the first area information if the query terminal list does not include the terminal in the first terminal list; or determine the target terminal list according to the query terminal list and the location information of the terminal in the query terminal list and combining the first information and the first area information if the query terminal list includes the terminal in the first terminal list; or determine the target terminal list according to the first terminal list, the query terminal list, the location information of the terminal in the query terminal list, and combining the first area information and the first information if the query terminal list does not include the terminal in the first terminal list.

Optionally, in some embodiments, the target terminal list includes at least one third type terminal, the third type terminal is included in at least one of the first terminal list or the second terminal list, and is included in the at least one specific terminal of the first information, and the third type terminal is within the first area; or the target terminal list includes at least one fourth type terminal, the fourth type terminal is included in at least one of the first terminal list or the second terminal list, and is included in the at least one specific terminal of the first information, the fourth type terminal is within the first area, and the query device has a query authority for the fourth type terminal.

Optionally, in some embodiments, the communication unit 410 is further configured to:

transmit a fifth message to a third network device, the fifth message including the first area information, and the fifth message being used to request querying the terminal within the first area.

Optionally, in some embodiments, the communication unit 410 is further configured to: receive a third terminal list from the third network device, the third terminal list including the terminal within the first area.

Optionally, in some embodiments, the network device 400 further includes a processing unit. The processing unit is configured to determine the target terminal list according to the third terminal list; or determine the target terminal list according to the third terminal list and first information, the first information including information of at least one specific terminal.

Optionally, in some embodiments, the target terminal list includes at least one fifth type terminal, and the fifth type terminal is included in the third terminal list and is included in the at least one specific terminal of the first information; or the target terminal list includes at least one sixth type terminal, the sixth type terminal is included in the third terminal list and is included in the at least one specific terminal of the first information, and the query device has a query authority for the sixth type terminal.

Optionally, in some embodiments, the first information includes at least one of the following:

identification information of a plurality of specific terminals;

type information of the plurality of specific terminals;

slice information to which the plurality of specific terminals belong;

network information to which the plurality of specific terminals belong;

information of a query device with a query authority corresponding to the plurality of specific terminals.

Optionally, in some embodiments, the identification information of the specific terminal is a subscription permanent identifier (SUPI) or a generic public subscription identifier (GPSI) assigned by the 3GPP network to the specific terminal; or the identification information of the specific terminal is an identification of the specific terminal outside the 3GPP network.

Optionally, in some embodiments, the information of the query device with a query authority corresponding to specific terminal includes: identification information or address information of the query device that the specific terminal belongs to or is registered with, or identification information or address information of the query device having an authority to manage or query the specific terminal.

Optionally, in some embodiments, the communication unit 410 is further configured to: acquire the first information from the query device or a second network device.

Optionally, in some embodiments, the communication unit 410 is specifically configured to: acquire the first information from the query device or the second network device during a process of registering to the 3GPP network; or acquire the first information from the query device or the second network device after the process of registering to the 3GPP network.

Optionally, in some embodiments, the query device is an unmanned aerial system traffic management (UTM), an unmanned aerial vehicle service supplier (USS) or a third party authorized entity (TPAE).

Optionally, in some embodiments, the second network device is an access and mobility management function (AMF) entity.

Optionally, in some embodiments, the third network device is a gateway mobile location centre (GMLC) entity.

Optionally, in some embodiments, the network device 400 is a network exposure function (NEF) entity.

Optionally, in some embodiments, the communication unit may be a communication interface or transceiver or an input-output interface of a communication chip or a system-on-chip. The processing unit may be one or more processors.

It should be understood that the network device 400 according to the embodiment of the present disclosure may correspond to the first network device in the method embodiment of the present disclosure, and the above and other operations and/or functions of the individual units in the network device 400 are designed to implement the respective flow of the first network device or UAVF in the embodiment of the method illustrated in FIG. 3-FIG. 6, respectively, which will not be repeated here for the sake of brevity.

FIG. 8 illustrates a schematic block diagram of a network device 500 according to an embodiment of the present disclosure. As illustrated in FIG. 8, the network device 500 includes a communication unit 510

The communication unit 510 is configured to receive a fifth message from a first network device, the fifth message including first area information, and the fifth message being used to request querying a terminal within a first area indicated by the first area information; and transmit a third terminal list to the first network device, the third terminal list including a terminal within the first area.

Optionally, in some embodiments, the network device 500 further includes a processing unit.

The processing unit is configured to determine second area information according to the first area information, the second area information being area information defined by 3rd generation partnership project (3GPP) network.

Optionally, in some embodiments, the processing unit is specifically configured to:

in response to that the first area information is area information defined by the 3GPP network, determine the first area information as the second area information; or in response to that the first area information is not the area information defined by the 3GPP network and the first area information is capable of being mapped to the area information defined by the 3GPP network, determine area information that is defined by the 3GPP network and mapped by the first area information as the second area information; or in response to that the first area information is not the area information defined by the 3GPP network and the first area information is not capable of being mapped to the area information defined by the 3GPP network, determine area information that includes the first area and is defined by the 3GPP network as the second area information.

Optionally, in some embodiments, the communication unit 510 is further configured to:

transmit a sixth message to a second network device, the sixth message including the second area information, and the sixth message being used to request querying a terminal list within the second area indicated by the second area information.

Optionally, in some embodiments, the communication unit 510 is further configured to:

receive a seventh message from the second network device, the seventh message including a fourth terminal list, and the fourth terminal list including the terminal within the second area.

Optionally, in some embodiments, the network device 500 further includes a processing unit.

The processing unit is configured to determine the third terminal list according to the fourth terminal list.

Optionally, in some embodiments, the third terminal list is the fourth terminal list.

Optionally, in some embodiments, the seventh message further includes a fifth terminal list, and the fifth terminal list includes a terminal that may be within the second area.

Optionally, in some embodiments, the terminal that may be within the second area includes a terminal that is in an idle state and whose registration area intersects with the second area.

Optionally, in some embodiments, the network device 500 further includes a processing unit.

The processing unit is configured to determine, according to location service (LCS) localization mechanism, location information of a terminal in at least one of the fourth terminal list or the fifth terminal list.

Optionally, in some embodiments, the processing unit is specifically configured to: determine the third terminal list according to the fourth terminal list, the fifth terminal list and the location information of the terminal in the fifth terminal list and combining the first area information, or determine the third terminal list according to the fourth terminal list, the location information of the terminal in the fourth terminal list, the fifth terminal list and the location information of the terminal in the fifth terminal list, and combining the first area information.

Optionally, in some embodiments, the second network device is an access and mobility management function (AMF) entity.

Optionally, in some embodiments, the network device 500 is a gateway mobile location centre (GMLC) entity.

Optionally, in some embodiments, the first network device is a network exposure function (NEF) entity.

Optionally, in some embodiments, the communication unit may be a communication interface or transceiver or an input-output interface of a communication chip or a system-on-chip. The processing unit may be one or more processors.

It should be understood that the network device 500 according to the embodiment of the present disclosure may correspond to the third network device in the method embodiment of the present disclosure, and the above and other operations and/or functions of the individual units in the network device 500 are designed to implement the respective flow of the third network device or GMLC in the embodiment of the method illustrated in FIG. 3-FIG. 6, respectively, which will not be repeated here for the sake of brevity.

FIG. 9 illustrates a schematic block diagram of a network device 600 according to an embodiment of the present disclosure. As illustrated in FIG. 9, the network device 600 includes a communication unit 610.

The communication unit 610 is configured to receive an eighth message, the eighth message including second area information, and the eighth message being used to request querying a terminal within a second area indicated by the second area information.

Optionally, in some embodiments, the communication unit 610 is further configured to:

reply a ninth message, the ninth message including a terminal list within the second area.

Optionally, in some embodiments, the network device 600 is an access and mobility management function (AMF) entity.

Optionally, in some embodiments, the communication unit may be a communication interface or transceiver or an input-output interface of a communication chip or a system-on-chip.

It should be understood that the network device 600 according to the embodiment of the present disclosure may correspond to the second network device in the method embodiment of the present disclosure, and the above and other operations and/or functions of the individual units in the network device 600 are designed to implement the respective flow of the second network device or AMF in the embodiment of the method illustrated in FIG. 3-FIG. 6, respectively, which will not be repeated here for the sake of brevity.

Figure 10:
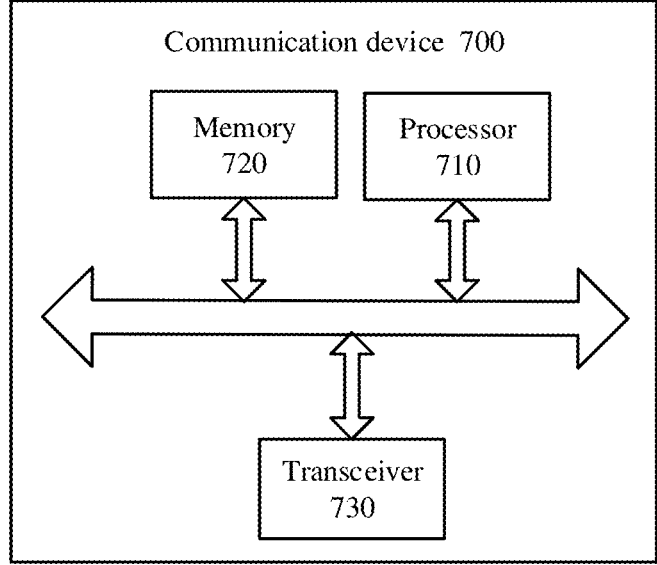
FIG. 10 is a schematic block diagram of a communication device provided by another embodiment of the present disclosure.

FIG. 10 is a schematic structural diagram of a communication device 700 provided by an embodiment of the present disclosure. A communication device 700 illustrated in FIG. 10 includes a processor 710 that can call and execute a computer program from a memory to implement the method in an embodiment of the present disclosure.

Optionally, as illustrated in FIG. 10, the communication device 700 may also include a memory 720. The processor 710 that can call and execute a computer program from memory 720 to implement a method in an embodiment of the present disclosure.

The memory 720 may be a separate device independent of the processor 710 or may be integrated in the processor 710.

Optionally, as illustrated in FIG. 10, the communication device 700 may also include a transceiver 730, the processor 710 may control the transceiver 730 to communicate with other devices, and in particular may send information or data to other devices, or receive information or data sent by other devices.

The transceiver 730 may include a transmitter and a receiver. The transceiver 730 may further include antennas, and the number of antennas may be one or more.

Optionally, the communication device 700 may be specifically a network device of an embodiment of the present disclosure, and the communication device 700 may implement corresponding processes implemented by the network device in the respective methods of the embodiment of the present disclosure, which will not be repeated here for the sake of brevity.

Optionally, the communication device 700 may be specifically a mobile terminal/a terminal device of an embodiment of the present disclosure, and the communication device 700 may implement corresponding processes implemented by the mobile terminal/the terminal device in the respective methods of the embodiment of the present disclosure, which will not be repeated here for the sake of brevity.

Figure 11:
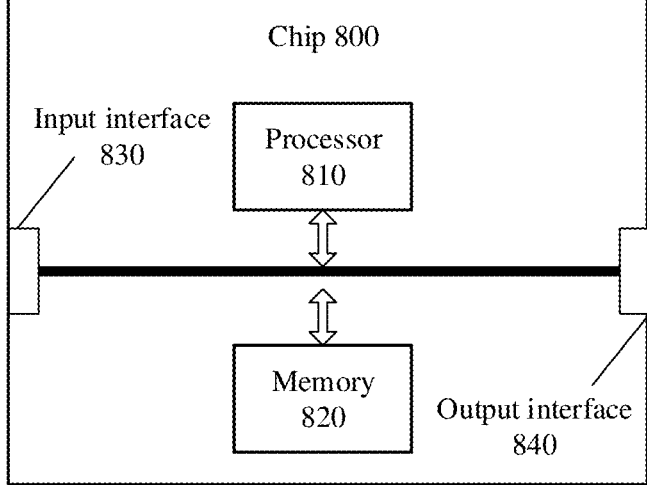
FIG. 11 is a schematic block diagram of a chip provided by an embodiment of the present disclosure.

FIG. 11 is a schematic diagram of a chip according to an embodiment of the present disclosure. A chip 800 illustrated in FIG. 11 includes a processor 810 that can call and execute a computer program from memory to implement the method in an embodiment of the present disclosure.

Optionally, as illustrated in FIG. 11, the chip 800 may also include a memory 820. The processor 810 that can call and execute a computer program from memory 820 to implement a method in an embodiment of the present disclosure.

The memory 820 may be a separate device independent of the processor 810 or may be integrated in the processor 810.

Optionally, the chip 800 may also include an input interface 830. The processor 810 may control the input interface

830 to communicate with other devices or chips, and in particular may obtain information or data sent by other devices or chips.

Optionally, the chip 800 may also include an output interface 840. The processor 810 may control the output interface 840 to communicate with other devices or chips, and in particular may output information or data to other devices or chips.

Optionally, the chip may applied to be a network device of an embodiment of the present disclosure, and the chip may implement corresponding processes implemented by the network device in the respective methods of the embodiment of the present disclosure, which will not be repeated here for the sake of brevity.

Optionally, the chip may applied to be a mobile terminal/a terminal device of an embodiment of the present disclosure, and the chip may implement corresponding processes implemented by the mobile terminal/the terminal device in the respective methods of the embodiment of the present disclosure, which will not be repeated here for the sake of brevity.

It should be understood that the chip referred to in embodiments of the present disclosure may also be referred to as system-level chip, system chip, chip system or system-on-chip or the like.

It should be understood that the processor may be an integrated circuit chip having signal processing capability. In implementation, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in embodiments of the present disclosure. The general purpose processor can be a microprocessor or any conventional processor. The operations of the method disclosed in the embodiment of the disclosure can be directly embodied as the completion of the execution of the hardware decoding processor or the completion of the combined execution of the hardware and software modules in the decoding processor. The software module may be located in RAM, flash memory, read-only memory, programmable read-only memory or electrically erasable programmable memory, registers and other mature storage media in the art. The storage medium is located in the memory, and the processor reads the information in the memory to complete the operations of the aforementioned method in conjunction with its hardware.

It will be appreciated that the memory in embodiments of the present disclosure may be volatile memory or non-volatile memory, or may also include both volatile and non-volatile memory. The non-volatile memory may be read-only memory (ROM), programmable ROM (PROM), erasable PROM (EPROM), electrically EPROM (EPROM) or flash memory. The volatile memory may be random access memory (RAM), which serves as an external cache. By way of illustration but not limitation, many forms of RAM are available, for example, static RAM (SRAM), dynamic RAM (DRAM), synchronous DRAM (SDRAM), double data rate SDRAM (DDR SDRAM), enhanced SDRAM (ESDRAM), synchronous link DRAM (SL-DRAM), direct rambus RAM (DR RAM), etc. It should be noted that the memory of the systems and methods described herein is intended to include but not limited to these and any other suitable types of memory.

It should be understood that the memory described above is exemplary but not limiting, for example, the memory in embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), direct rambus RAM (DR RAM), etc. That is, memory in embodiments of the present disclosure is intended to include but not limited to these and any other suitable types of memory.

A computer-readable storage medium provided by the embodiment of the present disclosure, configured to store a computer program.

Optionally, the computer-readable storage medium may applied to be a network device of an embodiment of the present disclosure, and the computer program causes the computer to implement corresponding processes implemented by the network device in the respective methods of the embodiment of the present disclosure, which will not be repeated here for the sake of brevity.

Optionally, the computer-readable storage medium may applied to be a mobile terminal/a terminal device of an embodiment of the present disclosure, and the computer program causes the computer to implement corresponding processes implemented by the mobile terminal/the terminal device in the respective methods of the embodiment of the present disclosure, which will not be repeated here for the sake of brevity.

In an embodiment of the present disclosure, there is provided a computer program product, which includes computer program instructions.

Optionally, the computer program product may applied to be a network device of an embodiment of the present disclosure, and the computer program instructions cause the computer to implement corresponding processes implemented by the network device in the respective methods of the embodiment of the present disclosure, which will not be repeated here for the sake of brevity.

Optionally, the computer program product may applied to be a mobile terminal/a terminal device of an embodiment of the present disclosure, and the computer program instructions causes the computer to implement corresponding processes implemented by the mobile terminal/the terminal device in the respective methods of the embodiment of the present disclosure, which will not be repeated here for the sake of brevity.

In an embodiment of the present disclosure, there is provided a computer program.

Optionally, the computer program may applied to be a network device of an embodiment of the present disclosure, when run on the computer, the computer program causes the computer to implement corresponding processes implemented by the network device in the respective methods of the embodiment of the present disclosure, which will not be repeated here for the sake of brevity.

Optionally, the computer program may applied to be a mobile terminal/a terminal device of an embodiment of the present disclosure, when run on the computer, the computer program causes the computer to implement corresponding processes implemented by the mobile terminal/the terminal device in the respective methods of the embodiment of the present disclosure, which will not be repeated here for the sake of brevity.

Those skilled in the art will appreciate that the various example units and algorithm steps described in connection with the embodiments disclosed herein can be implemented in electronic hardware or a combination of computer software and electronic hardware. Whether these functions are performed in hardware or software depends on the specific application and design constraints of the technical solution. Professionals can use different methods for each particular application to implement the described functionality but such implementation should not be considered outside the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other ways. For example, the above-described embodiment of the apparatus is only schematic, for example, the division of the unit is only a logical function division, and in practice, there may be another division mode, for example, multiple units or components may be combined or integrated into another system, or some features may be ignored or not performed. On the other hand, the coupling or direct coupling or communication connection between each other illustrated or discussed may be indirect coupling or communication connection through some interface, device or unit, and may be electrical, mechanical or other form.

The units illustrated as separate elements may or may not be physically separated, and the elements displayed as units may or may not be physical units, i.e. may be located in a place, or may be distributed over a plurality of network units. Part or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

The functions may be stored in a computer-readable storage medium if it is implemented in the form of software functional units and sold or used as independent products. Based on such an understanding, the technical solutions according to the disclosure in essence or the part contributing to the prior art or the part of the technical solution can be embodied in the form of a software product, and the computer software product is stored in a storage medium, which includes several instructions so that a computer device (may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art can easily think of changes or substitutions within the technical scope disclosed in the disclosure, which should be covered within the protection scope of the disclosure. Therefore, the scope of protection of the disclosure shall be subject to the scope of protection of the claim.

The invention claimed is:

1. A method for wireless communication, comprising:
receiving, by a first network device, a first message from a query device, wherein the first message comprises first area information, and the first message is used to request querying terminal information within a first area indicated by the first area information;
determining, by the first network device, second area information according to the first area information, wherein the second area information is area information defined by 3rd generation partnership project (3GPP);
transmitting, by the first network device, a second message to a second network device, wherein the second message comprises the second area information, and the second message is used to request querying terminal information within the second area indicated by the second area information;
receiving, by the first network device, a third message replied by the second network device, wherein the third message comprises a first terminal list, and the first terminal list comprises at least one terminal within the second area;
determining, by the first network device, a target terminal list according to the first terminal list; or determining, by the first network device, the target terminal list according to the first terminal list and first information, wherein the first information comprises information of at least one specific terminal; and
transmitting, by the first network device, the target terminal list within the first area to the query device,
wherein determining, by the first network device, the second area information according to the first area information comprises:
determining area information which is equal to or larger than the first area information as the second area information.

2. The method of claim 1, further comprising:
verifying, by the first network device, a query authority of the query device for the target terminal list.

3. The method of claim 1, further comprising:
transmitting, by the first network device, a fourth message to a third network device, wherein the fourth message comprises a query terminal list, and the fourth message is used to request location information of at least one terminal in the query terminal list;
wherein the query terminal list comprises the first terminal list; or
the query terminal list comprises at least one terminal determined according to the first terminal list and first information;
wherein the first information comprises information of at least one specific terminal.

4. The method of claim 3, further comprising:
receiving, by the first network device, location information of the at least one terminal in the query terminal list replied by the third network device.

5. The method of claim 4, further comprising:
determining, by the first network device, the target terminal list according to the location information of the at least one terminal in the query terminal list and combining the first area information.

6. The method of claim 5, further comprising:
verifying, by the first network device, a query authority of the query device for the target terminal list.

7. The method of claim 1, wherein the first information comprises at least one of the following:
identification information of a specific terminal;
type information of a specific terminal.

8. The method of claim 7, further comprising:

acquiring, by the first network device, the first information from a second network device.

9. The method of claim 8, wherein acquiring, by the first network device, the first information from the second network device comprises:

acquiring, by the first network device, the first information from the second network device during a registration procedure in a 3GPP network.

10. The method of claim 1, wherein the query device is an unmanned aerial system traffic management (UTM), an unmanned aerial vehicle service supplier (USS) or a third party authorized entity (TPAE).

11. The method of claim 1, wherein the second network device is an access and mobility management function (AMF) entity.

12. The method of claim 1, wherein the first network device is a network exposure function (NEF) entity.

13. A second network device, comprising a processor and a memory, wherein the memory is configured to store a computer program, and the processor is configured to call and run the computer program stored in the memory to cause the second network device to:

receive an eighth message, wherein the eighth message comprises second area information, and the eighth message is used to request querying terminal information within a second area indicated by the second area information; and reply a ninth message, wherein the ninth message comprises a first terminal list within the second area, to enable a first network device to determine a target terminal list according to the first terminal list, or to determine the target terminal list according to the first terminal list and first information, wherein the first information comprises information of at least one specific terminal, wherein the second area information is area information defined by 3rd generation partnership project (3GPP) and determined according to first area information, wherein determining the second area information according to the first area information comprises: determining area information which is equal to or larger than the first area information as the second area information.

14. The network device of claim 13, wherein the second network device is an access and mobility management function (AMF) entity.

15. A first network device, comprising a processor and a memory, wherein the memory is configured to store a computer program, and the processor is configured to call and run the computer program stored in the memory to cause the first network device to:

receive a first message from a query device, wherein the first message comprises first area information, and the first message is used to request querying terminal information within a first area indicated by the first area information;

determine second area information according to the first area information, wherein the second area information is area information defined by 3rd generation partnership project (3GPP);

transmit a second message to a second network device, wherein the second message comprises the second area information, and the second message is used to request querying terminal information within the second area indicated by the second area information;

receive a third message replied by the second network device, wherein the third message comprises a first terminal list, and the first terminal list comprises at least one terminal within the second area;

determine a target terminal list according to the first terminal list; or determine the target terminal list according to the first terminal list and first information, wherein the first information comprises information of at least one specific terminal; and transmit the target terminal list within the first area to the query device, wherein the processor is further configured to cause the first network device to:

determine area information which is equal to or larger than the first area information as the second area information.

16. The first network device of claim 15, wherein the processor is further configured to cause the first network device to:

verify a query authority of the query device for the target terminal list.

17. The first network device of claim 15, wherein the processor is further configured to cause the first network device to:

transmit a fourth message to a third network device, wherein the fourth message comprises a query terminal list, and the fourth message is used to request location information of at least one terminal in the query terminal list;

wherein the query terminal list comprises the first terminal list; or the query terminal list comprises at least one terminal determined according to the first terminal list and first information;

wherein the first information comprises information of at least one specific terminal.

18. The first network device of claim 17, wherein the processor is further configured to cause the first network device to:

receive location information of the at least one terminal in the query terminal list replied by the third network device.

19. The first network device of claim 18, wherein the processor is further configured to cause the first network device to:

determine the target terminal list according to the location information of the at least one terminal in the query terminal list and combining the first area information.

20. The first network device of claim 19, wherein the processor is further configured to cause the first network device to:

verify a query authority of the query device for the target terminal list.

* * * * *